United States Patent
Chunxu et al.

(10) Patent No.: US 7,613,164 B2
(45) Date of Patent: Nov. 3, 2009

(54) METHOD AND APPARATUS FOR GENERATING AND DISTRIBUTING AN INTERNAL CLOCK FOR RADIO NETWORK CONTROLLER

(75) Inventors: Li Chunxu, Shanghai (CN); Vianney Andrieu, Velizy (FR); Liu Weiwei, Shanghai (CN); Marc Freynet, Shanghai (CN); Li Qing, Shanghai (CN); Pierre Delbreil, Velizy (FR); Alf Neustadt, Stuttgart (DE)

(73) Assignee: Alcatel, Paris (FR)

( * ) Notice: Subject to any disclaimer, the term of this patent is extended or adjusted under 35 U.S.C. 154(b) by 651 days.

(21) Appl. No.: 10/979,168

(22) Filed: Nov. 3, 2004

(65) Prior Publication Data

US 2005/0146363 A1    Jul. 7, 2005

(30) Foreign Application Priority Data

Nov. 4, 2003    (CN) .................. 2003 1 0103298

(51) Int. Cl.
*H04J 3/06* (2006.01)
*H04L 12/66* (2006.01)
*H04W 68/00* (2009.01)
*H04L 5/00* (2006.01)
*H04L 7/00* (2006.01)
*G06F 1/00* (2006.01)

(52) U.S. Cl. .................. 370/350; 370/354; 455/460; 713/400; 713/500

(58) Field of Classification Search .............. 370/350, 370/354, 438; 713/400, 500; 455/460
See application file for complete search history.

(56) References Cited

U.S. PATENT DOCUMENTS

| 4,791,629 | A  | * | 12/1988 | Burns et al. ............... 370/363 |
| 6,597,912 | B1 | * | 7/2003  | Lu et al. .................... 455/445 |
| 6,643,791 | B1 | * | 11/2003 | Teodorescu ................ 713/500 |
| 6,687,514 | B1 | * | 2/2004  | Dauerer et al. ............. 455/561 |
| 6,847,652 | B1 | * | 1/2005  | Fourcand et al. ........... 370/438 |
| 6,983,391 | B2 | * | 1/2006  | Woods et al. ............... 713/400 |
| 7,092,366 | B2 | * | 8/2006  | Jang et al. ................ 370/310.2 |
| 2005/0123085 | A1 | * | 6/2005 | Skog et al. ................. 375/354 |

FOREIGN PATENT DOCUMENTS

WO    WO 99/31910    6/1999

* cited by examiner

*Primary Examiner*—Lester Kincaid
*Assistant Examiner*—Nathan Mitchell
(74) *Attorney, Agent, or Firm*—Sughrue Mion, PLLC

(57) ABSTRACT

A method for generating an internal clock in a radio network controller and a relevant transmission processing board. The transmission processing board comprises; a clock signal selector for extracting a clock signal from a synchronous/asynchronous line connected with a core network when said transmission processing board functions as a master transmission processing board, or for obtaining a clock signal from a clock bus of a sub-rack in which said transmission processing board is located when said transmission processing board functions as a slave transmission processing board; a phase-locked loop for generating a reference transmission clock based on the clock signal extracted or obtained by said clock signal selector; and a clock driver for transmitting the generated reference transmission clock to the clock bus of the sub-rackin which said transmission processing board is located when said transmission processing board functions as a master transmission processing board.

13 Claims, 3 Drawing Sheets

METHOD AND APPARATUS FOR GENERATING AND DISTRIBUTING AN INTERNAL CLOCK FOR RADIO NETWORK CONTROLLER

FIELD OF THE INVENTION

The present invention relates generally to mobile communication system, and particularly to a method and apparatus for generating and distributing an internal clock for a radio network controller in a mobile communication system.

BACKGROUND OF THE INVENTION

In the mobile communication system shown in FIG. 1, a core network 103 is connected with a radio network controller 1041 located in an access network 104 via a STM-1(level-1 Synchronous Transmission Module)/E1 (European Transmission Standard-E1)/T1 (North American or Japanese Transmission Standard-T1) line. Generally, a dedicated clock board (not shown in FIG. 1) is provided inside of the radio network controller 1041 for extracting a transmission clock from the STM-1/E1/T1 line, and then transmitting the transmission clock to backplanes of chassis at various layers. Various types of processing boards are connected to the backplanes of the chassis. The radio network controller 1041 is jointly composed by the chassis, clock boards, various types of processing boards and some other components. Each processing board in the radio network controller 1041 obtains the aforesaid transmission clock from the backplane of the chassis and generates a radio clock, that is, radio frame numbers, derived from the transmission clock independently according to its own requirements.

The types of the boards in the radio network controller is actually increased by the above method for extracting the transmission clock with a dedicated clock board, and thus it reduces the reliability of the mobile communication system. Moreover, additional cables are generally needed in this method to connect external STM-1/E1/T1 lines with the clock board, which increases the complexity of the external lines of the radio network controller. Furthermore, in order to make the various types of processing boards generate radio clocks based on the transmission clock, each processing board has to be designed individually. Consequently, no ready-made commercial board can be used in the system employing this method, and thus it reduces the flexibility of system development and increases development costs.

SUMMARY OF THE INVENTION

The object of the present invention is to solve the above technical problems by providing a method and apparatus for generating and distributing an internal clock for a radio network controller.

In order to realizing the above object, the present invention provides a method for generating an internal clock in a radio network controller, characterized by comprising steps of:

extracting, on a master transmission processing board, a clock signal from a synchronous/asynchronous line connected with a core network;

generating, on said master transmission processing board, a reference transmission clock based on said clock signal extracted from said synchronous/asynchronous line; and transmitting said reference transmission clock to a clock bus of a sub-rack in which said master transmission processing board is located.

The present invention further provides a method of generating an internal clock in a radio network controller, characterized by comprising steps of:

generating, on a specified transmission processing board, a reference transmission clock;

counting, on said specified transmission processing board, said reference transmission clock to generate a radio clock;

broadcasting periodically said radio clock from said specified transmission processing board to at least one radio processing board in said radio network controller.

The present invention further provides a transmission processing board for a radio network controller, characterized by comprising:

a clock signal selector for extracting a clock signal from a synchronous/asynchronous line connected with a core network when said transmission processing board functions as a master transmission processing board, or for obtaining a clock signal from a clock bus of a sub-rack in which said transmission processing board is located when said transmission processing board functions as a slave transmission processing board;

a phase-locked loop for generating a reference transmission clock based on the clock signal extracted or obtained by said clock signal selector; and a clock driver for transmitting the generated reference transmission clock to a clock bus of a sub-rack in which said transmission processing board is located when said transmission processing board functions as a master transmission processing board.

The present invention further provides a transmission processing board for a radio network controller, characterized by comprising:

a reference transmission clock generator;

a radio clock generator for counting said reference transmission clock and generating a radio clock;

a Network Time Protocol/Simple Network Time Protocol server for broadcasting periodically said radio clock from said transmission processing board to at least one radio processing board in said radio network controller.

According to the methods and apparatuses of the present invention, the clock unit is integrated on transmission processing boards or STM-1/E1/T1 interface boards, and thus, it is not necessary to provide dedicated clock boards and additional cables for connecting external STM-1/E1/T1 lines. Therefore, the method and apparatuses of the present invention diminishes the types of boards in the radio network controller, and lower the complexity of the external lines in the system.

Furthermore, according to the method and apparatus of the present invention, the radio clock is generated inside of a transmission processing board and then periodically broadcasted to each processing board using NTP/SNTP. Since each of the processing boards does not have to generate wireless clock itself, it is not necessary to design each of the processing boards independently. In this way, the flexibility of the system development will be improved and the development costs will be cut down by using ready-made commercial boards.

The other features and merits of the present invention will be more clear after perusing the details of the embodiments of the present invention referring to the drawings.

DESCRIPTION OF THE PREFERRED EMBODIMENTS

Figure 1:
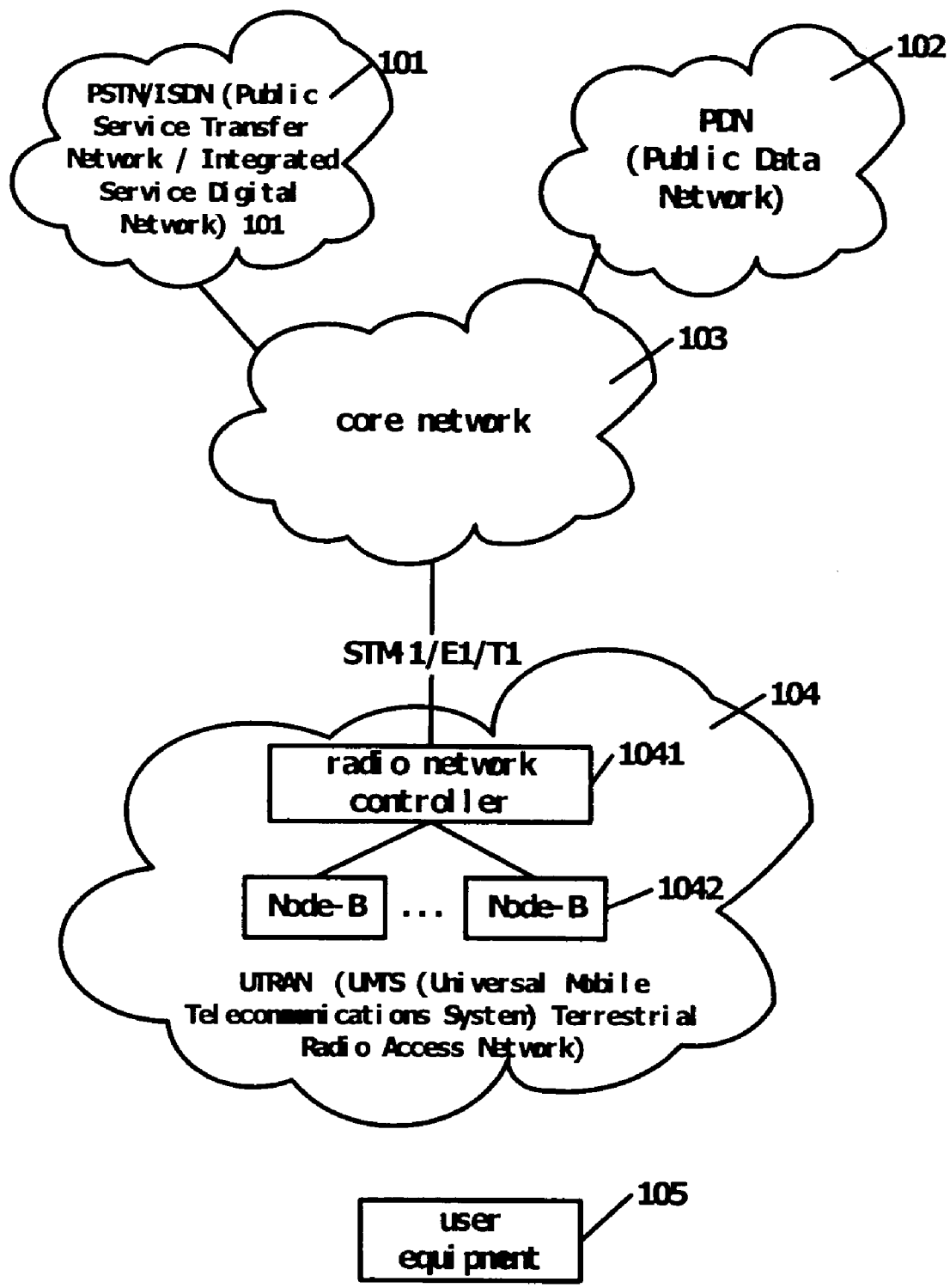
FIG. 1 is a schematic drawing of a radio mobile communication system.

The embodiments of the present invention are described in detail below by referring to the drawings.

FIG. 1 is a schematic drawing of a radio mobile communication system. As shown in FIG. 1, the mobile communication system comprises three main parts, that is, a core network denoted by reference number 103, a UTRAN (UMTS (Universal Mobile Telecommunications System) Terrestrial Radio Access Network) denoted by reference number 104, and a user equipment denoted by reference number 105.

The UTRAN 104 includes at least one radio network controller (RNC) 1041 (only one shown in FIG. 1) and a plurality of Node-Bs 1042. The Node-B 1042 functions as a base station in a 3G mobile communication system to communicate with a plurality of user equipments 105. Each radio network controller 1041 is connected with corresponding Node-Bs 1042 via the ground lines or microwaves and controls the Node-Bs 1042 connected thereto. As a result, the radio network controller 1041 is also called base station controller (BSC) in some networks. Each radio network controller 1041 is connected with the core network 103 via STM-1/E1/T1 lines.

The core network 103 comprises at least two domains, that is, a circuit switching domain and a packet switching domain (both of them not shown in FIG. 1), which are respectively connected with PSTN/ISDN (Public Service Transfer Network/Integrated Service Digital Network) 101 and PDN (Public Data Network) 102.

Since the present invention is mainly related to the radio network controller 1041, the specific description of the other parts shown in FIG. 1 is omitted.

The radio network controller 1041 comprises several racks. Each rack comprises several sub-racks. Each sub-rack comprises several processing boards. Each processing board may be classified as, for example, CP (Call Processing) board, RP (Radio Processing) board, TP (Transmission Processing) board, and OMCP (O&M Control Processing) board. All processing boards are placed in board slots provided in a backplane of the rack so as to be connected with a bus of the backplane. A sub-rack switching unit is employed to perform data switching amonog the processing boards in the sub-rack. A rack switching unit is employed to perform data switching among different racks and different sub-racks.

In the present invention, an internal clock is generated by a TP (Transmission Processing) board. Next, the process of generating and distributing a internal clock will be described in the two aspects of: (1) generating and distributing the transmission clock; and (2) generating and distributing the radio clock.

Firstly, the description of generating and distributing the transmission clock will be given.

Assume that the radio network controller 1041 contains several TP (transmission processing) boards. Some TP boards are connected with the core network 103 via STM-1 lines. One TP board is designated as a master TP board and the others are deemed as slave TP boards. The master TP board extracts a clock from the STM-1/E1/T1 line of the core network 103 as a reference clock signal, i.e. a reference transmission clock. Then, the master TP board distributes the reference transmission clock to all of the slave TP boards by means of, for example, the bus at the backplane of the rack (such as the backplane bus at a Advanced TCA chassis conforming to the PICMG 3.1 standard).

Figure 2:
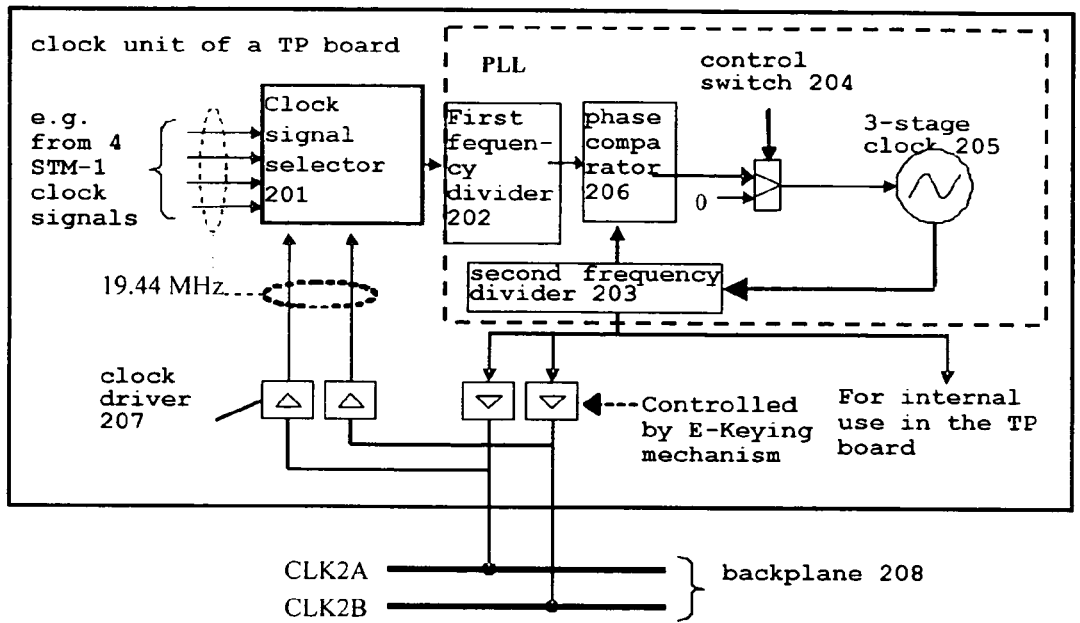
FIG. 2 is a schematic drawing illustrating the process of extracting, generating a transmission clock and distributing it in a sub-rack.

FIG. 2 is a schematic drawing illustrating the process of extracting, generating a reference transmission clock and distributing it in a sub-rack, which describes the case of generating and distributing a reference transmission clock in one sub-rack. As shown in FIG. 2, a clock unit of a TP board comprises: a clock selector 201, a first frequency divider 202, a second frequency divider 203, a control switch 204, a 3-stage clock 205, a phase comparator 206, and several clock drivers 207, wherein a PLL (Phase Locked Loop) is composed of such main components as the fist frequency divider 202, the second frequency divider 203, the 3-stage clock 205, the phase comparator 206 and so on.

The technology relating to phase locked loop is well known in the art. The crystal oscillator in the phase-locked loop (such as the 3-stage clock 205 shown in FIG. 2) is regularly adjusted to match the phase of input signal and locked at the frequency of the input signal. Besides stabilizing specific communication channels (to set it at a specified frequency), the phase-locked loop is also used for generating signals, modulating/demodulating signals, reconstructing low noise signals, multiplying or dividing frequency. The feature of the phase-locked loop is that after the phase-locked loop enters the loop lock state, the frequency stability of the signal output by the phase-locked loop can match the stability of the input signal of the phase-locked loop, and an approximately fixed phase difference between the output signal and input signal is maintained.

The TP board in FIG. 2 can function as either a master TP board or a slave TP board. A shelf manager (not shown) decides which one of the TP boards functions as the master TP board by means of E-keying mechanism, and the rest function as slave TP boards. On the TP board connected to the core network (see the reference number 103 in FIG. 1), the clock signal selector 201 is connected to the core network via the STM-1 line.

In the case that the TP board shown in FIG. 2 functions as the master TP board, the clock signal selector 201 extracts the clock signal from the STM-1 line, and then input the extracted clock signal into phase-locked loop (PLL). The output signal of the phase-locked loop becomes the generated reference clock signal, which is also called reference transmission clock.

As shown in FIG. 2, the transmission clock output from the phase-locked loop is provided for the internal use of the TP board. Meanwhile, it is also output, via the corresponding clock driver 207, to a clock bus (which corresponds to CLK2A and CLK2B in the example shown in FIG. 2) located in the backplane of the chassis 208. The transmission clock is generated according to the above process.

In the case that the TP board shown in FIG. 2 functions as a slave TP board, the clock signal selector 201 obtaines the clock signal from the clock bus (shown as CLK2A and CLK2B in FIG. 2) located in the backplane 208. Following the process similar to the above, the clock signal obtained by the clock signal selector 201 is input into the phase-locked loop (PLL) which then outputs the transmission clock for the internal use of the slave TP board. At that time, the shelf manager (not shown) has designated the TP board as a slave TP board by means of E-keying mechanism, and the E-keying mechanism has controlled the clock driver to disable it, wherein the clock driver is located on the connection line between the output of the phase-locked loop and the clock bus of the backplane. Thus, the transmission clock output by the phase-locked loop cannot be transmitted to the clock bus of the backplane. In other words, the shelf manager decides, by means of the E-keying mechanism, that only the master TP board can acquire the control over the clock bus; and no clock signal output by the phase-locked loop in the slave TP boards can arrive at the clock bus. The transmission clock can be distributed among the slave TP boards via the clock bus according to the aforesaid process.

Furthermore, it is noted that there is a local crystal oscillator on each TP board, which can meet the requirements of the 3-stage clock precision. If the master TP board cannot extract a valid clock signal from the STM-1 line, the performance is temporally maintained by the local crystal oscillator. Sequentially, a message is transmitted to the O&M (Operation & Maintenance) center located in the OMCP (O&M Control Processing) board so as to inform the O&M center to select another TP board connected to the core network as the master TP board; and a request is transmitted to the shelf manager so as to inform the shelf manager to activate the TP board selected by O&M center as the master TP board in order to make it work as a master TP board.

The radio network controller in the present invention can adopt any appropriate chassis as the sub-rack of the system. As an example, a very economical and convenient example, the radio network controller of the present invention adopts commercial AdvancedTCA chassis conforming to the PICMG 3.1 standard as sub-racks of the system. Of course, as an example, AdvancedTCA chassis cannot restrict the scope of the present invention.

Six differential clock buses are provided in the backplane for a AdvancedTCA chassis, wherein each of the differential clock buses is connected with all the board slots on the backplane 208. Therefore, all TP boards, no matter the master TP board or slave TP boards, can be physically connected to the clock bus on the backplane 208.

The six differential clock buses are divided into 3 groups, that is, CLK1A/CLK1B, CLK2A/CLK2B, and CLK3A/CLK3B, in which A and B are backups for each other.

The characteristics of CLK1A/CLK1B and the CLK2A/CLK2B have been defined as:

CLK1A/CLK1B are dedicated to 8 kHz clock signal;

CLK2A/CLK2B are dedicated to 19.44 MHz clock signal (for a 3-stage clock of SDH/SONET devices).

CLK3A/CLK3B can be customized. They can be backups for each other, or can be used independently.

In the example of FIG. 2, CLK2A/CLK2B are used as the clock bus of the radio network controller in the present invention.

Although it is just shown in FIG. 2 that the clock signal selector 201 extracts the transmission clock from the synchronous line—the STM-1 line, the clock signal selector 201 also can extract the transmission clock from an asynchronous line, such as E1 or T1 line. Extracting clock signal from a synchronous line or an asynchronous line constitutes no restriction to the present invention.

Figure 3:
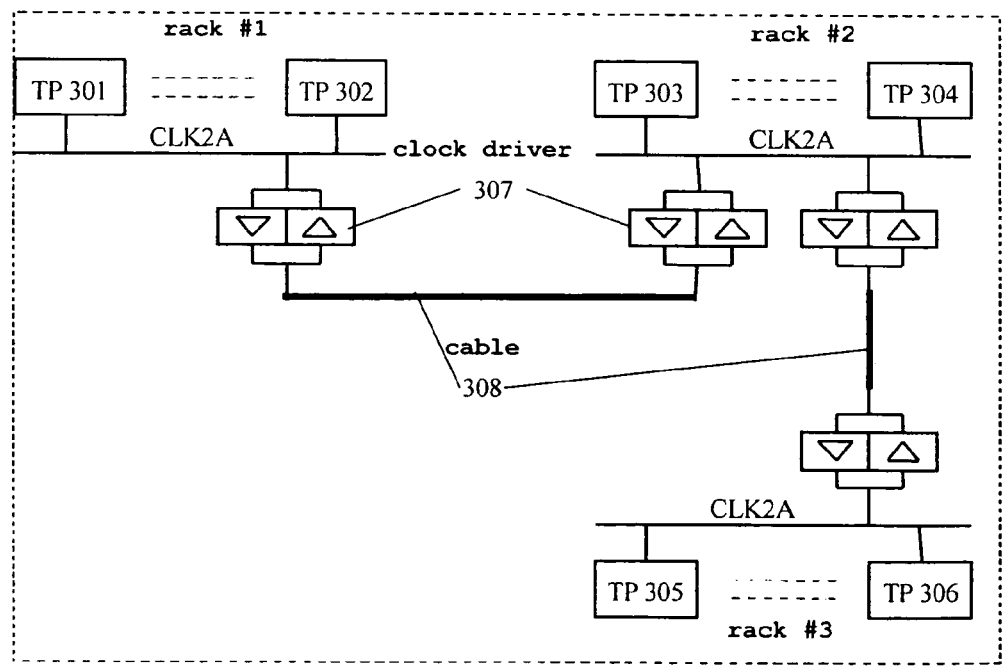
FIG. 3 is a schematic drawing illustrating the process of distributing the transmission clock among different sub-racks in the whole rack.

FIG. 3 is a schematic drawing illustrating the process of distributing the transmission clock among different sub-racks in the whole rack. In FIG. 3, it takes one clock bus-CLK2A shown in FIG. 2 as an example to explain how to distribute the transmission clock in the whole rack (i.e., across sub-racks).

The example shown in FIG. 3 involves three sub-racks, that is, sub-rack 1, sub-rack 2 and sub-rack 3. Only two TP boards and their respective clock bus CLK2A are schematically shown in each sub-rack. The sub-rack 1 comprises, for example, a TP board 301 and a TP board 302; the sub-rack 2 comprises, for example, a TP board 303 and a TP board 304; the sub-rack 3 comprises, for example, TP board 305 and TP board 306.

Each of the sub-racks also comprises several clock drivers 307. In fact, the clock drivers 307 are located in the TP board, wherein their driving direction can be controlled by the shelf manager and the O&M center.

The clock buses (e.g. CLK2A) in each sub-rack are connected with one another by means of appropriate number of cables 308 and appropriate number of clock drivers 307. Thus, the transmission clock generated by the master TP board can be transmitted through the connected clock buses and distributed to all slave TP boards in each sub-rack.

In order to improve the forward maintainability of the whole rack, two connectors can be provided on the front panel of the TP board to guarantee the forward connection of cables.

In order to guarantee the redundancy of the transmission clock, the number of the TP boards in a sub-rack is preferably even, that is, 0, 2, 4 and so on to give attention to distributing CLK2A and CLK2B between the sub-racks. To consider the features of APS 1+1 in SDH, this requirement is reasonable.

The process of generating and distributing the transmission clock has been described above. The process of generating and distributing a radio clock will be described below.

Figure 4:
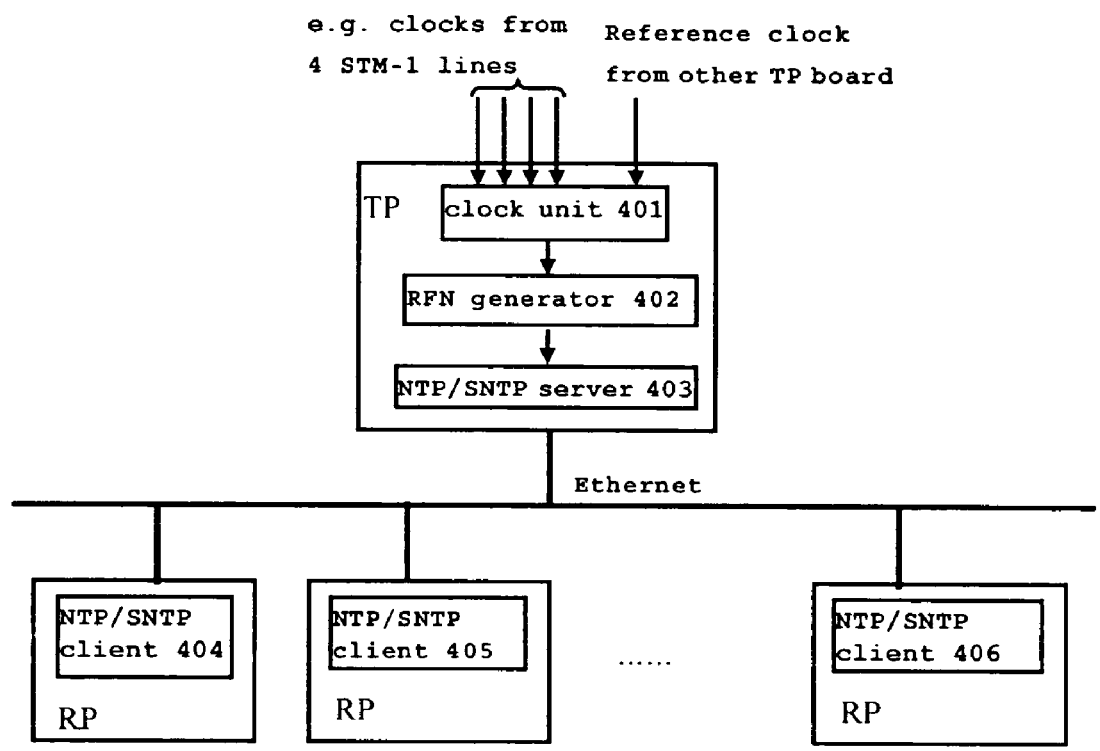
FIG. 4 is a schematic drawing illustrating the process of generating and distributing the radio clock.

FIG. 4 is a schematic drawing showing the process of generating and distributing the radio clock (i.e. radio frame number). FIG. 4 illustrates one transmission processing (TP) board and several radio processing (RP) boards. The TP board comprises a clock unit 401, a radio frame number (RFN) generator 402 and a NTP/SNTP (network time protocol/simple network time protocol) server 403, wherein the clock unit 401 has the functions and structure as shown in FIG. 2. The NTP/SNTP is used to synchronize the time of computer clocks in a computer network. Since this protocol has been standardized in the Internet, it is not necessary to describe it much here.

The TP board is connected with several RP boards via an Ethernet. Each RP board provides a NTP/SNTP client. The example shown in FIG. 4 involves three RP boards, which respectively comprise a NTP/SNTP client 404, a NTP/SNTP client 405 and a NTP/SNTP client 406.

On the TP board, the clock unit 401 generates the reference transmission clock based on the clock signal from 4 STM-1 lines (while the TP board functions as the master TP board); or receives the reference transmission clock from other TP boards via the clock bus of the backplane (while the TP board functions as a slave TP board). Of course, as shown in FIG. 2, the clock unit 401 may also generate the reference transmission clock based on the clock signal from an asynchronous line, such as E1 or T1.

The RFN generator 402 generates RFN (radio frame number) by counting the reference transmission clock output from the clock unit 401.

Next, the NTP/SNTP server 403 periodically (e.g. every ten minutes) broadcasts RFNs via the Ethernet (with a 125 microsecond precision) to all the NTP/SNTP clients in the RP boards by means of NTP/SNTP protocol. Each RP board independently maintains its RFN in each period. The clocks on the RP boards are sufficient to avoid large deviation during the time period between each broadcast of the RFN synchronization.

In principle, the RFN generator 402 and the NTP/SNTP server 403 may be located in any TP boards; however, they must be laid on the same TP board. The O&M center (not shown) will decide which TP board they can be laid on.

If the RFN generator 402 and NTP/SNTP server 403 fail, the NTP/SNTP server 403 will inform the O&M center on the OMCP. After informed, the O&M center chooses another TP board to perform the process of generating and distributing the radio clock.

According to the aforesaid solution, the TP board needs only to transmit the transmission clock to all other TP boards, for example, through a chain.

The radio network controller of the present invention can be easily constructed by adopting the transmission processing boards shown in FIGS. 2-4.

While particular embodiments of the present invention have been described referring to the drawings herein, it will be appreciated by those skilled in the art that changes and modifications may be made thereto within the scope of the following claims.

What is claimed is:

1. A method for generating an internal clock in a radio network controller, comprising:
   extracting, on one of a plurality of transmission processing boards that generate clock signals comprised by said radio network controller, hereinafter master transmission processing board, a clock signal from a synchronous/asynchronous line connected with a core network;
   generating, on said master transmission processing board, a reference transmission clock based on said clock signal extracted from the said synchronous/asynchronous line; and
   transmitting said reference transmission clock to a clock bus of a sub-rack in which said master transmission processing board is located.

2. The method for generating an internal clock according to claim 1, further comprising:
   transmitting said reference transmission clock generated by said master transmission processing board from said clock bus of the sub-rack in which said master transmission processing board is located to a clock bus of another sub-rack.

3. The method for generating an internal clock according to claim 2, further comprising:
   obtaining a clock signal from said clock bus of another sub-rack on a slave transmission processing board connected with said clock bus;
   generating a reference transmission clock on said slave transmission processing board based on the clock signal obtained from said clock bus, wherein said reference transmission clock is used internally in said slave transmission processing board.

4. A method for generating an internal clock in a radio network controller, comprising:
   extracting, on a master transmission processing board, a clock signal from a synchronous/asynchronous line connected with a core network;
   generating, on said master transmission processing board, a reference transmission clock based on said clock signal extracted from the said synchronous/asynchronous line; and
   transmitting said reference transmission clock to a clock bus of a sub-rack in which said master transmission processing board is located
   in case of said master transmission processing board cannot extract the clock signal from said synchronous/asynchronous line, an Operation & Maintenance center in said radio network controller selecting a slave transmission processing board connected with said core network to function as a master transmission processing board.

5. A method for generating an internal clock in a radio network controller, comprising:
   generating, on a specified transmission processing board, a reference transmission clock;
   counting, on said specified transmission processing board, said reference transmission clock to generate a radio clock;
   broadcasting periodically said radio clock from said specified transmission processing board to at least one radio processing board in said radio network controller,
   wherein said generating the reference transmission clock further comprises:
      extracting a clock signal from a synchronous/asynchronous line connected with the core network on said specified transmission processing board;
      generating said reference transmission clock on said specified transmission processing board based on the clock signal extracted from said synchronous/asynchronous line.

6. The method for generating an internal clock according to claim 5, wherein said generating the reference transmission clock further comprises:
   obtaining a clock signal from a connected clock bus on another transmission processing board;
   generating said reference transmission clock on the said another transmission processing board based on the clock signal obtained from said clock bus.

7. The method for generating an internal clock according to claim 5, further comprising:
   in case of said specified transmission processing board fails, an Operation & Maintenance center of said radio network controller selecting another transmission processing board connected with said clock bus as said specified transmission processing board.

8. A transmission processing board for a radio network controller, comprising:
   a clock signal selector for extracting a clock signal from a synchronous/asynchronous line connected with a core network when said transmission processing board functions as a master transmission processing board, and for obtaining a clock signal from a clock bus of a sub-rack in which said transmission processing board is located when said transmission processing board functions as a slave transmission processing board;
   a phase-locked loop for generating a reference transmission clock based on the clock signal extracted or obtained by said clock signal selector; and
   a clock driver for transmitting the generated reference transmission clock to the clock bus of the sub-rack in which said transmission processing board is located when said transmission processing board functions as a master transmission processing board.

9. The transmission processing board according to claim 8, further comprising:
   a cable for connecting clock buses of different sub-racks in said radio network controller.

10. The transmission processing board according to claim 9, further comprising:
    an additional clock driver for obtaining a clock signal from the clock bus of the sub-rack in which said transmission processing board is located and transferring the obtained clock signal to said clock signal selector when said transmission processing board functions as a slave transmission processing board.

11. A transmission processing board for a radio network controller, comprising:

a reference transmission clock generator;

a radio clock generator for counting said reference transmission clock and generating a radio clock;

a Network Time Protocol/Simple Network Time Protocol server for broadcasting periodically said radio clock from said transmission processing board to at least one radio processing board in said radio network controller.

12. The transmission processing board according to claim 11, wherein the reference transmission clock generator comprises:

a clock signal selector for extracting a clock signal from a synchronous/asynchronous line connected with a core network; and a phase-locked loop for generating said reference transmission clock based on the clock signal extracted by said clock signal selector.

13. The transmission processing board according to claim 11, wherein said reference transmission clock generator comprises:

a clock signal selector for obtaining a clock signal from a clock bus of the sub-rack in which said transmission processing board is located; and a phase-locked loop for generating said reference transmission clock based on the clock signal obtained by said clock signal selector.

* * * * *